(12) United States Patent
Evans

(10) Patent No.: US 11,924,237 B2
(45) Date of Patent: *Mar. 5, 2024

(54) DIGITAL ASSET BASED CYBER RISK ALGORITHMIC ENGINE, INTEGRATED CYBER RISK METHODOLOGY AND AUTOMATED CYBER RISK MANAGEMENT SYSTEM

(71) Applicant: RiskQ, Inc., Bainbridge, NY (US)

(72) Inventor: Maryellen Evans, New York, NY (US)

(73) Assignee: RiskQ, Inc., Bainbridge, NY (US)

( * ) Notice: Subject to any disclaimer, the term of this patent is extended or adjusted under 35 U.S.C. 154(b) by 224 days.

This patent is subject to a terminal disclaimer.

(21) Appl. No.: 16/822,231

(22) Filed: Mar. 18, 2020

(65) Prior Publication Data

US 2020/0389481 A1 Dec. 10, 2020

Related U.S. Application Data

(63) Continuation of application No. 16/585,202, filed on Sep. 27, 2019, now Pat. No. 11,750,633.

(60) Provisional application No. 62/737,161, filed on Sep. 27, 2018, provisional application No. 62/827,358, filed on Apr. 1, 2019.

(51) Int. Cl.
*H04L 29/06* (2006.01)
*G06Q 40/08* (2012.01)
*H04L 9/40* (2022.01)

(52) U.S. Cl.
CPC ......... *H04L 63/1433* (2013.01); *G06Q 40/08* (2013.01)

(58) Field of Classification Search
CPC ........................ H04L 63/1433; G06Q 40/08
See application file for complete search history.

(56) References Cited

U.S. PATENT DOCUMENTS

| 8,762,188 B2* | 6/2014 | Abercrombie | G06Q 10/04 705/7.11 |
| 9,762,605 B2* | 9/2017 | King-Wilson | G06Q 40/08 |
| 10,432,650 B2* | 10/2019 | Staniford | H04L 63/1425 |
| 10,438,207 B2* | 10/2019 | Subhedar | G06Q 20/405 |
| 2004/0006532 A1* | 1/2004 | Lawrence | G06Q 40/08 705/38 |
| 2006/0117388 A1* | 6/2006 | Nelson | G06F 11/008 714/E11.02 |
| 2007/0239495 A1* | 10/2007 | Osborn | G06Q 10/0639 714/E11.207 |

(Continued)

*Primary Examiner* — Ellen Tran
(74) *Attorney, Agent, or Firm* — Law Office of Scott P. Zimmerman, PLLC

(57) ABSTRACT

We are in a digital revolution. Over 85% of an organization's value is in digital form. Digital assets are systems, processes, data and technologies. Cyber exposures are quantified and cyber risks are scored. A graphical user interface visualizes a cyber-risk engine that quantifies cyber risk in alignment to how insurance companies pay claims, using flexible and multiple cyber risk algorithms that are prescribed in relationship to a customer's risk requirements. Digital asset cyber risk ratings are measured to increase cyber resiliency. A cyber risk management platform automates business processes across each cybersecurity function that provides data from near-real time cybersecurity tools for participants to reduce cyber risk back to acceptable risk tolerances and improve cyber resiliency.

11 Claims, 13 Drawing Sheets

(56) References Cited

U.S. PATENT DOCUMENTS

| | | | | |
|---|---|---|---|---|
| 2008/0288330 | A1* | 11/2008 | Hildebrand | G06Q 10/06398 |
| | | | | 705/7.42 |
| 2009/0281864 | A1* | 11/2009 | Abercrombie | G06Q 40/00 |
| | | | | 705/400 |
| 2015/0295948 | A1* | 10/2015 | Hassell | H04L 63/1433 |
| | | | | 726/25 |
| 2016/0203319 | A1* | 7/2016 | Coen | G06Q 30/0185 |
| | | | | 726/25 |
| 2016/0239665 | A1* | 8/2016 | Hamby | G06F 21/577 |
| 2017/0244740 | A1* | 8/2017 | Mahabir | H04L 63/1433 |

\* cited by examiner

FIG. 7

| Embodiment | Input 1 | Input 2 | Calculation | Output 1 |
|---|---|---|---|---|
| 701- Data Exfiltration Exposure | Number of Records associated to each system | Cost per record of a data breach – source: IBM Ponemon Cost of a Data Breach Report | Financial Exposure = Number of Records * Cost per Record | Data Exfiltration Exposure |
| 702- Business Interruption Exposure | Revenue processed by each system | Number of hours of lost operation from a DOS attack | Financial Exposure = revenue per system * number of hours to regain operations from a DOS attack | Business Interruption Exposure |
| 703 – GDPR Regulatory Exposure | Organizational Revenue | 20% | Financial Exposure = organizational revenue *20% or 20m Euro, whichever is higher | GDPR Regulatory Exposure |
| 704 - U.S Healthcare Regulatory Exposure | Number of healthcare records associated to each system | HIPAA violation penalty tiers - cost per record - $100 to $50,000 per record | Financial Exposure = number of records * cost per record from HIPPA violation penalty tier | HIPPA Regulatory Exposure |
| 705 – Credit Card Exposure | Number of credit card records associated to each system | Average $70 per record and $100,00 a month per each month noncompliant | Financial Exposure = (number of records * $70 a record) + (# of months noncompliant * $100,000) | PCI Exposure |
| 706 – U.S. Privacy Exposure | Number of privacy records associated to each system | Cost per record of a data breach – source IBM Ponemon | Financial Exposure = number of records * cost per record | Privacy Exposure |

FIG. 8

| Embodiment | Input 1 | Input 2 | Calculation | Output 1 |
|---|---|---|---|---|
| 801 – Digital Asset Security innovation impact | Level of security innovation – security baked in, bolted on or end of life | Weights of impacts | Impact algorithm = Level of security innovation * Weight of impact | Security innovation impact |
| 802- Digital Asset System location impact | Level of system location – where the system lives – on a secure isolated segment, on a cloud service, on a vendor network | Weights of impacts | Impact algorithm = Level of system location * Weight of impact | System location impact |
| 803 - Digital Asset Attack cadence impact | Level of attack cadence at system level – never attacked, attacked frequently, attacked occasionally, breached | Weights of impacts | Impact algorithm = Level of attack cadence at system level * Weight of impact | Attack cadence impact |
| 804 – Digital Asset Type dependency impact | Level of asset dependency at system level – crown jewel, business critical, business crucial | Weights of impacts | Impact algorithm = Level of asset dependency at system level * Weight of impact | Asset dependency impact |
| 805 - Regulatory dependency impact | Level of regulations the system must comply with – 0, 1, 2, 3, 4 | Weights of impacts | Impact algorithm = Level of regulations the system must comply with * Weight of impact | Regulatory dependency impact |
| 806 – Digital Asset System recovery time impact | Level of system recovery times – 0-4 hours, 4-12 hours, 12-24 hours, over 24 hours | Weights of impacts | Impact algorithm = Level of system recovery times * Weight of impact | System recovery time impact |
| 807 - Digital Asset Restoration cost impact | Level of restoration costs at system level – cost to restore the system | Weights of impacts | Impact algorithm = Level of restoration costs at system level * Weight of impact | Restoration cost impact |
| 808 - Digital Asset Records impact | Number of records at system level – number of records the system processes | Weights of impacts | Impact algorithm = Level of security innovation * Weight of impact | Records impact |
| 809 – Reputational impact | The level of reputational impact – rumor, regional press, international press for customer facing systems | Weights of impacts | Impact algorithm = Number of records at system level * Weight of impact | Reputational impact |
| 810- Stock impact | The level of stock impact from a breach if a public company – 10%, 25%, 50% | Weights of impacts | Impact algorithm = Level of stock impact from a breach if a public company * Weight of impact | Stock impact |

FIG. 9

| Embodiment | Input 1 | Input 2 | Calculation | Output 1 |
|---|---|---|---|---|
| 901- Digital Asset Number of users' likelihood | Number of users – 1-100, 101-250, 251-500, 501-1000, over 1000 | Weights of likelihood | Impact algorithm = Level of Number of users * Weight of likelihood | Digital Asset Number of users' likelihood |
| 902 - Digital Asset Types of users' likelihood | Types of users – employees, vendors, customers, employees and vendors, employees and customers, vendors and customers, vendors, employees and customers | Weights of likelihood | Impact algorithm = Level of Types of users * Weight of likelihood | Digital Asset Types of users' likelihood |
| 903 - Digital Asset System location likelihood | Level of system locations – OPAC nations, cyber aggressors, mature cyber countries | Weights of likelihood | Impact algorithm = Level of system locations * Weight of likelihood | Digital Asset System location likelihood |
| 904 - Digital Asset System accessibility likelihood | Level of system accessibilities – Credentials, VPN, no credentials | Weights of likelihood | Impact algorithm = Level of system accessibilities * Weight of likelihood | Digital Asset System accessibility likelihood |
| 905 – Digital Asset Localization of a breach likelihood | Level of breach proximities – impact only to system, impact to supply chain, impact to crown jewels, impact to crown jewels and supply chain | Weights of likelihood | Impact algorithm = Level of breach proximities * Weight of likelihood | Digital Asset Localization of a breach likelihood |
| 906 - Digital Asset Proximity to breach likelihood | Level of breach proximity – switch level, admin rights, user rights, Protocols through a DMZ and firewall like with a web application, anonymous public access | Weights of likelihood | Impact algorithm = Level of breach proximity * Weight of likelihood | Digital Asset Proximity to breach likelihood |
| 907 - Digital Asset Prior breach likelihood | Level of existence of prior breaches – none, 1, 2, 3, 4 or more | Weights of likelihood | Impact algorithm = Level of existence of prior breaches * Weight of likelihood | Digital Asset Prior breach likelihood |
| 908 - Digital Asset Resource skill likelihood | Level of resource skill - Deep knowledge of the system and infrastructure like with a home-grown system, some knowledge, General knowledge like with an off the shelf product | Weights of likelihood | Impact algorithm = Level of resource skill * Weight of likelihood | Digital Asset Resource skill likelihood |
| 909 - Resource number likelihood | Level of number of resources - Nation state teams needed (like with a Scada attack), moderate amount of resources, minimal amount of resources | Weights of likelihood | Impact algorithm = Number of resources level * Weight of likelihood | Resource number likelihood |

FIG. 10

| Embodiment | Input 1 | Input 2 | Calculation | Output |
|---|---|---|---|---|
| 1001- Digital Asset Inherent Cyber Risk Score | Aggregate of Impact Scores divided by # of impact attributes | Aggregate of Likelihood Scores divided by number of likelihood attributes | Input 1 multiplied by Input 2 | Digital Asset Inherent Cyber Risk Score |
| 1002- Digital Asset Cyber Risk Threshold | Asset Type | Asset Type Weight | | Digital Asset Cyber Risk Threshold |
| 1003- Digital Asset Residual Cyber Risk Score - Post Cybersecurity Assessment | Digital Asset Inherent Cyber Risk Score | Cybersecurity Assessment Score - % of controls in place across each control test | Digital Asset Inherent Cyber Risk Score * % of controls in place | Digital Asset Residual Risk Score - Post Cybersecurity Assessment |
| 1004- Digital Asset Residual Risk Score – Post Cyber Vulnerability | Residual Risk Score - Post Cybersecurity Assessment or Inherent Risk Score if Cybersecurity assessment not done | NVD Vulnerability Severity Ratings Base Score from NIST Database | Digital Asset Inherent Risk Score + (NVD Vulnerability Severity Ratings Base Score/10) | Digital Asset Residual Risk Score – Post Cyber Vulnerability |

FIG. 11

| Asset Type | Threshold |
|---|---|
| Crown Jewel | 1.5 |
| Business Critical | 2.5 |
| Business Crucial | 3.5 |

FIG. 12

| Embodiment | Input 1 | Input 2 | Calculation | Output |
|---|---|---|---|---|
| 1201- Vendor System Impact Score | Systems vendor works with | Aggregate of Digital Asset Cyber Inherent Risk Scores | Aggregation of each systems cyber risk score / # of systems | Vendor System Impact Score |
| 1202- Vendor Cyber Risk Exposure | System vendor works with | Cyber Risk Exposures per system | Aggregation of Cyber Risk Exposures for all systems vendor works with | Vendor Cyber Risk Exposure |

FIG. 13

| Embodiment | Input 1 | Input 2 | Calculation | Output |
|---|---|---|---|---|
| 1301- Number of vendor user likelihood | 1-5, 6-10, 11-20, 21-30, over 30 | Impact weights | Level of Number of vendor users * Impact weights | Number of vendor user likelihood |
| 1302- Vendor system access likelihood | User id, Admin id, VPN and Admin id, VPN and user id | Impact weights | Level of Number of vendor users * Impact weights | Vendor system access likelihood |
| 1303- CSP deployment type likelihood | None, SaaS, PaaS, IaaS | Impact weights | Level of Number of vendor users * Impact weights | CSP deployment type likelihood |
| 1304 - Cloud Service Models likelihood | None, Private, Hybrid, Public | Impact weights | Level of Number of vendor users * Impact weights | Cloud Service Model likelihood |
| 1305 –Vendor - Data type likelihood | PII, Healthcare, Credit Card, Intellectual Property, Supply Chain | Impact weights | Level of Number of vendor users * Impact weights | Vendor - Data type likelihood |
| 1306- Vendor -data breach history likelihood | No, within 3 months, within 6 months, within 12 months, within 24 months | Impact weights | Level of Number of vendor users * Impact weights | Vendor -data breach history likelihood |
| 1307- Type of vendor likelihood | Developer, Integrator, Cloud Service, Other | Impact weights | Level of Number of vendor users * Impact weights | Type of vendor likelihood |

FIG. 14

| Crown Jewel Assets | | | Impact | | | | |
|---|---|---|---|---|---|---|---|
| | | | None | Minor | Crucial | Critical | Disastrous |
| | | | 0-1 | 1-2 | 2-3 | 3-4 | 4-5 |
| Likelihood | Improbable | 0-1 | Priority 3 | Priority 3 | Priority 3 | Priority 2 | Priority 2 |
| | Seldom | 1-2 | Priority 3 | Priority 3 | Priority 2 | Priority 2 | Priority 2 |
| | Occasional | 2-3 | Priority 3 | Priority 2 | Priority 2 | Priority 2 | Priority 1 |
| | Likely | 3-4 | Priority 2 | Priority 2 | Priority 2 | Priority 1 | Priority 1 |
| | Frequent | 4-5 | Priority 2 | Priority 2 | Priority 1 | Priority 1 | Priority 1 |

| Business Critical Assets | | | Impact | | | | |
|---|---|---|---|---|---|---|---|
| | | | None | Minor | Crucial | Critical | Disastrous |
| | | | 0-1 | 1-2 | 2-3 | 3-4 | 4-5 |
| Likelihood | Improbable | 0-1 | Priority 4 | Priority 4 | Priority 4 | Priority 3 | Priority 3 |
| | Seldom | 1-2 | Priority 4 | Priority 4 | Priority 3 | Priority 3 | Priority 2 |
| | Occasional | 2-3 | Priority 4 | Priority 3 | Priority 3 | Priority 3 | Priority 2 |
| | Likely | 3-4 | Priority 3 | Priority 3 | Priority 3 | Priority 2 | Priority 2 |
| | Frequent | 4-5 | Priority 3 | Priority 3 | Priority 2 | Priority 2 | Priority 2 |

| Business Crucial Assets | | | Impact | | | | |
|---|---|---|---|---|---|---|---|
| | | | None | Minor | Crucial | Critical | Disastrous |
| | | | 0-1 | 1-2 | 2-3 | 3-4 | 4-5 |
| Likelihood | Improbable | 0-1 | Priority 5 | Priority 5 | Priority 5 | Priority 4 | Priority 4 |
| | Seldom | 1-2 | Priority 5 | Priority 5 | Priority 4 | Priority 4 | Priority 4 |
| | Occasional | 2-3 | Priority 5 | Priority 4 | Priority 4 | Priority 4 | Priority 3 |
| | Likely | 3-4 | Priority 4 | Priority 4 | Priority 4 | Priority 3 | Priority 3 |
| | Frequent | 4-5 | Priority 4 | Priority 4 | Priority 3 | Priority 3 | Priority 3 |

FIG. 15

| System Type | Inherent Risk Average | Residual Risk Average | Goal | Resiliency | Percent to Goal |
|---|---|---|---|---|---|
| Crown Jewel | 2.90 | 2.30 | 1.00 | 43.5% | 56.5% |
| Business Critical | 3.70 | 3.50 | 2.00 | 57.1% | 42.9% |
| Business Crucial | 3.90 | 3.70 | 3.00 | 81.1% | 18.9% |

FIG. 16

| Embodiment | Input 1 | Input 2 | Calculation | Output |
|---|---|---|---|---|
| 1601- Reputational Cyber Risk Amplification | Stock Price | Percent Impact | Data Exfiltration Exposure * Percent Impact | Reputational Cyber Risk Amplification |
| 1602- Legal Cyber Risk Amplification | Data Exfiltration Exposure | Percent Impact | Data Exfiltration Exposure * Percent Impact | Legal Cyber Risk Amplification |
| 1603- Operational Cyber Risk Amplification | Business Interruption Exposure | Percent Impact | Data Exfiltration Exposure * Percent Impact | Operational Cyber Risk Amplification |

FIG. 17

| Embodiment | Input 1 | Input 2 | Calculation | Output |
|---|---|---|---|---|
| 1701- Data Exfiltration Risk Reduction | Data Exfiltration Exposure | Risk Reduction | Data Exfiltration Exposure * Risk Reduction | Data Exfiltration Risk Reduction |
| 1702- Cybersecurity Tool ROI | Data Exfiltration Risk Reduction | Tool Cost | (Data Exfiltration Risk Reduction – Cost)/Cost | Cybersecurity Tool ROI |

FIG. 18

| Embodiment | Input 1 | Input 2 | Calculation | Output |
|---|---|---|---|---|
| 1801 – Cyber Insurance Exposure Limit for Aggregate Policy | Sum of Data Exfiltration Exposures each digital asset | None | Sum of Data Exfiltration Exposures each digital asset | Cyber Insurance Exposure Limit for Aggregate Policy |
| 1802- Cyber Insurance Exposure Limit for Business Interruption | Average Revenue Generated per hour | Percent of on-premise applications | Crown Jewel RTO * Percent of on-premise applications * Average Revenue Generated per hour | Cyber Insurance Exposure Limit for Business Interruption |

# DIGITAL ASSET BASED CYBER RISK ALGORITHMIC ENGINE, INTEGRATED CYBER RISK METHODOLOGY AND AUTOMATED CYBER RISK MANAGEMENT SYSTEM

CROSS-REFERENCE TO RELATED APPLICATIONS

This patent application is a continuation of U.S. application Ser. No. 16/585,202 filed Sep. 27, 2019 and incorporated herein by reference in its entirety. This patent application also claims the benefit of U.S. Provisional Application No. 62/737,161 filed Sep. 28, 2018 and of U.S. Provisional Application No. 62/827,358 filed Apr. 1, 2019, with both provisional applications incorporated herein by reference in their entireties.

BACKGROUND OF THE INVENTION

1. Field of the Invention

Embodiments of the present invention apply to the quantification of cyber risk exposures, cyber risk scoring, cyber risk amplification and cyber risk management, more specifically in terms of the risk of the digital assets across an enterprise. Digital assets are what is attacked by cybercriminals.

Furthermore, the strategic aspects of the invention apply to cyber resiliency, cyber M&A, cyber insurance, cyber budgeting, cyber risk thresholds, cybersecurity tool return on investment (ROI), vendor cyber risk management and remediation prioritization.

2. Description of Related Art

Cyber risk is now the largest business risk due[1] to the increasing digitalization of a company's business assets, the exponential growth of the internet, regulation and technology innovation. Over 85% of an organization's assets are now in digital form.[2] This represents a 750% increase since 2001. Digital assets are systems, processes, data and technologies that have specific relationships. Any characteristic attributed to or derived from a digital asset will be inherited in a parent-child relationship to the other digital asset across the organization, rolled up to the business units, subsidiaries, parent company and holding company. The digital asset cyber risk can be associated to third-party vendors. See FIG. 1.

The average cost of a data breach in the United States today is $3.6 M[3] and the annual cost of cybercrime will top $8.8 T by 2022[4]. Cyber risk is an enterprise risk. There are several common denominators that influence the amount of cyber risk today, all that require a better understanding at the board/executive level. Boards and executives are the risk owners with the fiduciary duty to protect the business assets. Today, digital assets represent the majority of business assets. Exponential growth in cyber threats is first and foremost due to the growth of the attack surface which includes the use of the internet. There has been a 600% increase in internet usage from 0.5 b users in 2001 to over 4.1 b users in 2017[5].

Secondly, cybersecurity regulation is finally catching up to technology. As recently demonstrated with the Facebook and Cambridge Analytica data breach where a lack of knowledge and permissions impact on an individual's privacy and are now a major concern[6]. Facebook was fined $5 billion by the Federal Trade Commission (FTC) in July of 2019. Couple that with the European Union General Data Protection Regulation (GDPR)[7] and we are looking at fines of 4% of annual revenue or €20 m whichever is higher for non-compliance in the case of a privacy breach or misuse of an EU citizen's privacy data. Several states in the U.S. are now enacting privacy legislation as a result of the GDPR and increased high profile privacy breaches.

Thirdly, everything is interconnected. Over the past several decades we have seen technology that connects devices, systems and other organizations allowing for businesses to accelerate their growth. Payments processes are a good example of this. A point of sale system uses a device (technology) to authorize payments for a good or service. This payment may be sent to a $3^{rd}$ party data processor who sends the payment data to a bank. This chain of interconnected processes have been a part of our business infrastructures for decades. In many cases, Middleware software has been used to connect companies across the globe. Cyber risk is not just the risk to your organization; it also includes the risk you assume when you connect to others. Couple this with the innovation associated with the Internet of Things (IOT) that according to Gartner states that we have 8.4 billion connected things in use worldwide in 2017, up 31 percent from 2016, and will reach 20.4 billion IoT devices by 2027[8]. Most of these devices have no embedded cybersecurity controls considerably increasing the attack surface. Among many examples, in 2017, Xiongmai Technology, an IoT camera manufacturer from Hangzhou admitted its cameras had been exploited by the Mirai malware to form part of a botnet that launched a distributed denial-of-service (DDoS) attack targeting websites including Twitter, PayPal, and Spotify. The assault was one of the worst in US history.[9]

Lastly, the heavy use of cloud technologies and vendors are creating uncertainly as to what roles are played in cybersecurity. By 2018, the typical IT department will have the minority of their applications and platforms (40%) residing in on premise systems[10]. The majority (up to 63%) of reported cyber breaches are related to third-party vendors.[11] There is little clarity on what role and responsibility the organization plays, and the vendor plays in cybersecurity and risk management.

Most importantly, as indicated earlier the board and senior executives have the fiduciary duty to protect the business assets. However, most boards and executives are mystified by cyber. Recently, Aon announced that cyber events now rank among the top three triggers for director and officers (D&O) derivative actions[12]. This is game changing information that drives home the need for boards and executives to understand cyber risk and its impacts on their business as a means to rebut these claims.

"Given the significant cyber-attacks that are occurring with disturbing frequency, and the mounting evidence that companies of all shapes and sizes are increasingly under a constant threat of potentially disastrous cyber-attacks, ensuring the adequacy of a company's cybersecurity measures needs to be a critical part of a board of director's risk oversight responsibilities: CF Disclosure Guidance: Topic No. 2, Cybersecurity Oct. 13, 2011[13]

SUMMARY OF THE INVENTION

It is therefore an object of the present invention to fill the above-noted void.

It is another object of the invention to use a graphical user defined interface as a cyber-risk engine to create digital asset cyber risk quantification algorithms that can be used to create multiple risk models based on a series of selection functions that enables risk modeling participants to model risk across the digital assets. The invention will allow for quantification of financial cyber risk exposures in terms of data exfiltration, business interruption and regulatory loss scenarios aligned to the organization's digital assets. Data exfiltration, business interruption and regulatory loss are directly related to how cyber insurance companies pay claims. This approach applies both to 1st party organizational and 3rd party vendor cyber risk.

Additional impacts that act as amplifiers of the financial risk exposures that can be derived from reputational, operational and legal data.

In addition, 'cyber risk scores' based on digital asset data attributes from subjective questionnaires will show gaps in the effectiveness of the cybersecurity programs that demonstrate internal cyber risk.

It is still another object of the invention to give the user 'cyber risk scoring' that includes inherent risk data that shows the cyber maturity of each digital asset comparatively, which allows for a clear line of sight into which digital assets are most important, thus allowing for continuous risk monitoring of "crown jewel" assets based on digital asset cyber risk exposures and comparative inherent cyber risk scores that allow for differentiation of inherent digital asset values for further cyber risk analysis providing more thought leadership and critical thinking from this new level of transparency.

It is also an object of the invention to give the user 'cyber risk scoring' from residual risk metrics in near real-time based on cyber findings from cybersecurity assessments (including but not limited to the NIST Cybersecurity Framework, ISO 27001, etc.), cybersecurity tools including but not limited to vulnerabilities and incidents from integration with cybersecurity tools like vulnerability management scanners (VMS) and security incident event management (SIEM) systems. The residual cyber risk metrics are calculated in relationship to the inherent risk metrics of the digital assets to measure cyber resiliency. If residual risk rises above the stated cyber risk tolerance, alerts can be sent to digital asset owners to provide immediate notification and recommended action to be taken if required. As such, the subject system enhances rather than supplants the value of cybersecurity tools to the cyber risk management process; ensuring the business perspective rather than limiting his perspective on vulnerabilities only. This point of view impacts the resilience through real-time visual indications of changing cyber conditions, the tactics cyber teams are using, and the level of risk reduction caused by these tactics.

Together, the subject system's combination of the digital risk engine information including quantification metrics, inherent and residual digital asset cyber risk scores and the integrated management platform offers organizations a "digital asset cyber risk" approach to the automation of complex cyber risk management strategies.

To achieve the above and other objects, the present invention is directed to a method for improving the process of cyber risk management by effectively visualizing the business impacts and cyber issues from a strategic perspective. The data provided via the algorithms and integration will allow the user near real-time information regarding the dynamic nature of cybersecurity. Preferred embodiments of the subject system overcome the limitations of vulnerability only based products and deep/dark web cyber scoring products by (1) enabling participants to have a business-based understanding of how cyber risk impacts their organization; (2) enabling users to monitor and take action regarding cyber impacts in near real time to reduce cyber risk; (3) quantifying the correct amount of cyber insurance to buy; (4) providing participants with useful metrics for cyber budgeting; (5) enabling users to resource efficiently to lower cyber risk to acceptable levels; (6) score vendor cyber risk based on the digital asset the vendor can compromise; (7) enabling digital asset risk quantification metrics for cyber M&A; (8) demonstrate the risk reduction benefit used to calculate the ROI of cybersecurity tools and; (9) provides users with an automated method for cyber risk management that reduces the cost of repetitive manual methods currently in use.

In addition, it is important to note that while the preferred embodiments of the subject system described herein reference primary usage in larger organizations over 250 people and can be used in a range of industries. Companies with lower cybersecurity maturities (generally <250 people) can utilize the compliance related functionality until their maturity increases.

The invention can be used also by cyber insurance companies to (1) quantify how much cyber insurance to sell based on an organizations cyber risk, (2) price polices derived from internal organizationally based cyber metrics, (3) manage third party risk thereby lowering first party risk, (4) analyze risk accumulation scenarios and (5) provide for good cyber steward discounts based upon the cybersecurity posture of the customer.

BRIEF DESCRIPTION OF THE DRAWINGS

Preferred embodiments of the present invention will be set forth in detail with reference to the drawings, in which:

FIG. 7 is a block diagram of the digital asset quantification algorithms used in the embodiment;

FIG. 8 depicts a chart of embodiments of the described technology as they relate to the digital asset impact calculations based on digital asset questionnaires that provide cyber risk scores;

FIG. 9 depicts a chart of embodiments of the described technology as they relate to the digital asset likelihood calculations based on digital asset questionnaires that provide cyber risk scores;

FIG. 10 depicts a chart of embodiments of the described technology as they relate to the digital asset inherent cyber risk calculations, digital asset risk thresholds, digital asset residual cyber risk scores based on security assessment data and cybersecurity tool data;

FIG. 11 is a block diagram of the digital asset types and associated risk thresholds on a scale of 0-5;

FIG. 12 depicts a chart of embodiments of the described technology as they relate to the vendor cyber risk impact calculations using the digital asset approach;

FIG. 13 depicts a chart of embodiments of the described technology as they relate to the digital asset vendor likelihood calculations based on digital asset questionnaires that provide cyber risk scores;

FIG. 14 is a chart of digital asset impact and likelihood scoring matrix with priorities for cyber risk remediation based on the type of asset classification;

FIG. 15 illustrates cyber resilience; and

FIG. 16 illustrates cyber risk exposure amplification;

FIG. 17 illustrates cybersecurity return on investment (ROI); and

FIG. 18 illustrates cyber insurance needs.

DETAILED DESCRIPTION OF THE PREFERRED EMBODIMENTS

Figure 1:
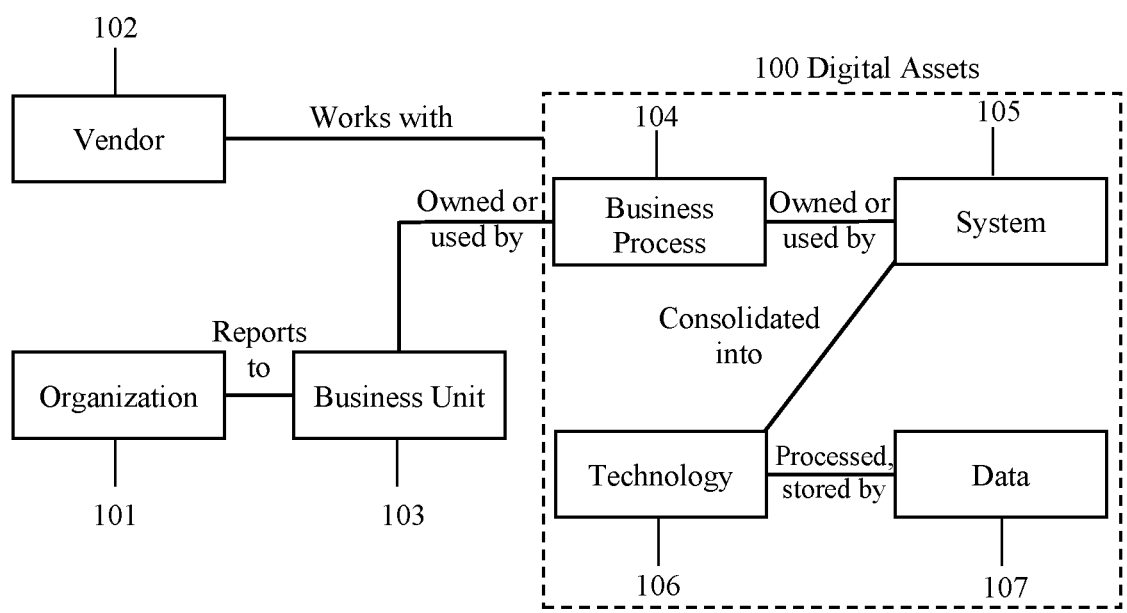
FIG. 1 is a block diagram of the digital assets and their relationships.

The technology (method and systems) described below relates to digital asset-based cyber risk modeling and are represented in a series of embodiments that allows for the quantification of financial loss at the digital asset level, digital asset cyber risk scoring and the related amplification of financial loss from reputational, operational and legal exposures from cybersecurity and how they relate to the cyber reliance of an organization.

DEFINTION OF TERMS

Definitions of Terms

"Digital Asset", in various embodiments, refers to the systems, business processes, technologies and data that are used as of basis of automation of work using computer technology and is an ecosystem.

"Technology", is computer related components that typically consist of hardware and software, databases, electronic communication protocols and devices.

"System", is a consolidated set of technologies that provides the basis for collecting, creating, storing, processing, and distributing information.

"Business Process" is a is set of digital rules that are utilized by one or more systems to take inputs, transform them and produce outputs that are reported or utilized by other systems.

"Data", is the information that is processed and stored.

"Data Classification", is the classification of the type of data processed. This can be one or more types including but not limited to privacy, personally identifiable (PII), patent, formula, healthcare, federal, business, credit card, supply chain data, etc.

"Cyber Risk Scores", are risk scores based on the impact and likelihood of digital asset attributes. It is the cornerstone of measuring cyber resiliency.

"Impact", is the degree to which a cyber-issue may have an adverse outcome on the organization.

"Likelihood", is a probability a cyber-attack will cause damage.

"Cyber Resiliency", is a measure of an entity's ability to continuously deliver the intended outcome despite adverse cyber events. It can be used to benchmark and define organizations goals in terms of cybersecurity.

"Cyber Exposures", are the financial risk that an organization is exposed to based on its cybersecurity posture. They are defined in three categories; data exfiltration, business interruption and regulatory loss and are aligned to what cyber insurance companies will pay out claims against.

"Data Exfiltration Exposure", happens when data is stolen by cyber criminals. This can be due to many causes including and not limited to misconfigured systems, poor access controls, from insiders or external actors. Specifically, it is the unauthorized copying, transfer or retrieval of data from a computer or server and is measured by the number of records stolen multiplied by the cost per record. Data exfiltration is a malicious activity performed through various techniques, typically by cybercriminals over the Internet or other networks.

"Business Interruption Exposure", happens when business as usual is interrupted when the authorized users cannot access an application. In cyber, it is typically a result of a denial of service attack or by ransomware. It is based on the revenue lost over the period of time to get the system back on-line.

"Regulatory Exposures", happen when a regulator fines an organization for a cyber-breach. The costs of the fines are defined by the regulator(s). This can happen by the U.S. Department of Health and Human Services in the case of data exfiltration of healthcare records, The PCI Security Council in the case of credit card data exfiltration, the European Supervisory Authority for EU citizen data exfiltration and other sector-based regulation.

"Inherent Cyber Risk", is the cyber risk score without controls in place or as if there was zero percent effectiveness of cybersecurity controls. It is the worst-case scenario and is also called 'cybergeddon' risk.

"Residual Cyber Risk", is the cyber risk score with controls in place. It is the best-case scenario.

"Cyber Insurance", is a risk transference mechanism to reduce risk in terms of business interruption, data exfiltration and regulatory losses due to cyber-attacks.

"Cyber Budget", Cyber budgets are a combination of fixed and variable costs and delineated by capital and operational expenses.

"Resources" is an operational or capital budget item. Operational resources are personnel and capital resources are equipment.

"Confidentiality", is the ability to ensure that only authorized and approved users have access to the data.

"Integrity", is ability to ensure that the data is unaltered and is consistent, accurate, and trustworthy over its entire life cycle.

"Availability", is ability to ensure the data is available to users.

"Risk Exposure Calculation", is a mathematical determination of the financial risk exposures.

"Cyber Risk Questionnaire", is a set of questions that are used to produce the cyber risk scores.

"Cyber Risk Attributes", are specific numerical or other measurable factors forming one of a set that defines a digital assets risk or sets the conditions of its operation.

"Cybersecurity Control Assessment", is a cybersecurity assessment that uses policies, and control tests to ascertain the level of effectiveness of a cyber-security control both organizationally and technically.

"Finding", is a result of a cybersecurity control assessment.

"Vulnerability", is a weakness in a system which can be exploited by a threat actor, such as an attacker, to perform unauthorized actions within a computer system. This weakness can be exploited to gain unauthorized access into a computer system leading to data exfiltration or data corruption. Vulnerabilities increase residual risk. Poor coding practices (i.e. storing passwords in code) can be a large source of vulnerabilities.

"Weights", refers to probability weighting that is used for percent complete metrics and maturity weighting of questions and answers in the cyber risk algorithms. Weighting are used to define which parameters are more important than others.

"Question Answers", Impact and likelihood answers are weighted on a scale of 1-5 that aligns to the cybersecurity maturity of the answer.
1—the most mature choice on the questionnaire.
2—2nd most mature answer.
3—3rd most mature answer.
4—2nd most immature answer.
5—the least mature choice on the questionnaire.

These maturity levels are associated to the answers relative to the risk questionnaire that measures likelihood and impact in terms of the context of the question.

"Assumption of breach", is a cybersecurity paradigm that dictates that you have been breached and will be breached again. It was defined by Robert Mueller at the RSA security conference in 2013.

"Enterprise Risk Management", is a business program that combines risk management disciplines across several genres such as operational, credit, cyber, etc.

"GDPR", is the General Data Protection Regulation that came into effect May 25, 2018 that protects EU citizen privacy data.

"NIST", is the National Institute of Standards and Technology, a unit of the U.S. Commerce Department. The NIST Cybersecurity Framework (CSF) is a set of 98 control tests that are used to demonstrate control effectiveness. The CSF provides a policy framework of computer security guidance for how private sector organizations in the United States can assess and improve their ability to prevent, detect, and respond to cyber-attacks.

"ISO", is the International Standards Organization. It publishes the ISO/IEC 27001, which is an information security standard, part of the ISO/IEC 27000 family of standards. The ISO/IEC 27001 framework applies to a management system that is intended to bring information security under management control and gives specific requirements. Organizations that meet the requirements may be certified by an accredited certification body following successful completion of an audit.

"New York State (NYS) Part 500 regulation", is a regulation establishing cyber-security requirements for financial services companies.

"PCI-DSS", is the Payment Industry Data Security Standard. It is a cybersecurity framework based on 6 groups of control objectives. It applies to banks, merchants and data processors who process credit card data.

"Board of Directors", in a public company, a board of directors (BoD) is a group of individuals, elected to represent the shareholders. A board's mandate is to establish policies for corporate management and oversight, make decisions on major company issues including cybersecurity. Every public company must have a board of directors.

"Chief Information Security Officer (CISO)", is a senior-level executive within an organization responsible for establishing and maintaining the enterprise vision, strategy, and cybersecurity program to ensure digital assets are adequately protected. There are two types of CISOs: governance and operational. Most companies only have one person who is doing the job of three people. A governance CISO is the individual responsible for the policies, management and monitoring of cyber risk. The operational CISO is the individual responsible for the day-to-day cybersecurity operations that includes implementation of tools, process and the management of the incident response and security teams. Both work with the board, compliance manager, auditors, etc. Approximately 50% of large organizations have a CISO.

"Data Privacy Officer (DPO)", is a senior-level executive within an organization responsible for data privacy. The DPO must ensure that the organization complies with GDPR regulation if it processes EU citizen privacy data regardless of where it is located. The DPO must have a deep knowledge of the GDPR and an awareness where possible regulatory breaches may occur. It is essential that the DPO effectively communicates the company's privacy principles and compliance regulations to employees and reports into the board usually.

"Compliance Manager or Officer", is an employee whose responsibilities include ensuring the company complies with its outside regulatory requirements and internal policies. A compliance officer may craft and update internal policies to mitigate the risk of the company breaking laws and regulations and lead internal audits of procedures. In cyber there are many regulations based on type of data processed, geography, and industry that a compliance manager must be familiar with.

"IT Auditors", are responsible for developing, planning, and executing IT audit programs based on risk assessments in a highly integrated audit environment. This includes documenting and communicating risks, providing counsel on control issues and recommended process changes, and monitoring corrective actions in order to improve the existing practices of the organization reducing cyber risk.

"Cyber Legal Team", is the legal team that will be involved when a breach occurs. Most likely all communications will be evaluated and approved by legal before they are released to the media or a regulator. The communications team usually crafts any breach notifications with the CISO and legal collaborating together.

"Firewalls", are a cyber-security tool that that prevents unauthorized access to or from a private network. This a basic cybersecurity tool and most small medium enterprises will have firewalls.

"Intrusion Detection System (IDS)", is a cyber-security tool that monitors systems for malicious activity or policy violations.

"Vulnerability Management System (VMS)", is a cyber-security tool that uses software in a cyclical manner to identify and classify vulnerabilities. VMS vendors include Qualys, Rapid7, Tripwire, Saint, Tenable, Core Security, Critical Watch, Beyond Security and many others.

"Data Loss Prevention (DLP)", is a cyber-security tool that provides rules to identify when data is accessed by authorized users and sent outside the organization and add additional rules to prevent unauthorized data leakage. It is found mostly in large organizations and those with privacy issues.

"Encryption", is a process used in cybersecurity that provides scrambling of data in such a way that only authorized parties can access it.

"Security Incident Event Management (STEM)", is a cyber-security tool that provides real-time analysis of security alerts generated by applications and network hardware to identify brute force, viruses and firewall attacks. This is a more sophisticated tool and large organizations tend to have a STEM, however managed security service providers (MSSPs) provide this type of service to smaller companies.

"Identity Access Management (TAM)", is a cyber-security tool that provides authorization and authentication of users to systems.

"Cyber Simulation (SIM)", is an automated approach to more effectively training Cybersecurity Operations (SOC) teams to adequately respond to evolving threats.

"Physical Security", are controls for physical access to the organization. These controls are locks, cameras, doors, fire suppression systems, personnel identification (badges), visitor security, etc. All organizations usually have some level of physical security. More mature have computerized means.

"Advanced Threat Prevention (ATP)", is a cyber-security tool that identifies malware, quarantines it, and allow it to be analyzed and identified in and between organizations.

"Cyber Threat Intelligence (CTI)", is a cyber-security tool that works in the deep and dark web to identify hackers and track their malicious activities. CTI provides detailed information about potential or current attacks that threaten an organization.

"Vendors", are third parties that provide goods or services to an organization.

"Cyber Threat", is a malicious attempt to damage or disrupt a computer network or system.

"Threat Actor", is an entity that is partially or wholly responsible for an incident that impacts or has the potential to impact an organization's cybersecurity. In threat intelligence, actors are generally categorized as external, internal or partners.

"Common Vulnerability Exposure (CVE)", is a database of vulnerabilities published by NIST. The Common Vulnerabilities and Exposures (CVE) database provides a reference-method for publicly known information-security vulnerabilities and exposures. The National Cybersecurity Federally Funded Research and Development Center (FRDC), operated by the Mitre Corporation, maintains the system, with funding from the National Cybersecurity Division of the United States Department of Homeland Security. The Security Content Automation Protocol that uses CVE, and CVE IDs are listed on MITRE's system as well as in the US National Vulnerability Database.

"Actuarial pricing", is the discipline that applies mathematical and statistical methods to assess risk and price policies in insurance, finance and other industries and professions.

"Mergers and Acquisitions (M&A)", is the area of corporate finance, management and strategy that deals with purchasing and/or joining with other companies. In a merger, two organizations join forces to become a new business, usually with a new name. In terms of digital assets, not all digital assets will be acquired or utilized in the merger or acquisition.

"Risk Accumulation Exposure", is the aggregation of losses from a single event due to the concentration of insured risk exposed to that single event. In cyber risk this based on the digital assets. Some examples are cloud compromise, and data exfiltration.

"Annual Revenue", is the amount of yearly income of an organization before taxes.

"Process Revenue", is the amount of revenue generated based on the use of a particular process.

"Verizon Data Breach Investigation Report (DBIR)", is annual security report from Verizon that provides vast statistics on data breach information.

"Distributed Denial of Service (DDOS)", happens when a cyber-offender takes action that prevents legitimate users from accessing targeted computer systems, devices or other network resources.

"Malware", is software that is intended to damage or disable computers and computer systems.

"Phishing", is the fraudulent practice of sending emails purporting to be from reputable individual in companies in order to induce users to reveal personal information, such as passwords and credit card numbers.

"Identify", is the first of the five NIST functions. The Identify Function assists in developing an organizational understanding to managing cyber-security risk to systems, people, assets, data, and capabilities. Understanding the business context, the resources that support critical functions, and the related cyber-security risks enables an organization to focus and prioritize its efforts, consistent with its risk management strategy and business needs.

"Protect", is the second of the five NIST functions. The Protect Function outlines appropriate safeguards to ensure delivery of critical infrastructure services. The Protect Function supports the ability to limit or contain the impact of a potential cyber-security event "Detect", is the third of the five NIST functions. The Detect Function defines the appropriate activities to identify the occurrence of a cyber-security event. The Detect Function enables timely discovery of cyber-security events.

"Respond", is the fourth of the five NIST functions. The Respond Function includes appropriate activities to act regarding a detected cyber-security incident. The Respond Function supports the ability to contain the impact of a potential cyber-security incident.

"Recover", is the fifth of the five NIST functions. The Recover Function identifies appropriate activities to maintain plans for resilience and to restore any capabilities or services that were impaired due to a cyber-security incident. The Recover Function supports timely recovery to normal operations to reduce the impact from a cyber-security incident "Cybersecurity Posture", in various embodiments, refers to the maturity and effectiveness of the various cybersecurity control measures and programs.

"Insured", in various embodiments, is a first- or third-party organization that has purchased cybersecurity insurance to transfer risk and increase cyber resiliency.

"Security Control Measures", in various embodiments refers to the means taken by organizations to identify, protect, detect, recover or respond to cyber-security. This includes people, process and tools.

"Recovery time objective" (RTO) is the maximum tolerable length of time that a computer, system, network, or application can be down after a failure or disaster occurs.

"Risk Quantifications", are calculations that use objective financial metrics that are derived metrics of the business and cyber related metrics derived from the organization.

"Risk Qualifications", are calculations that use subjective data from the business.

DESCRIPTION OF THE TECHNOLOGY

In one or more of the embodiments, the described technology allows for the inventory of digital assets. Digital assets are what is compromised in a cyber-attack and include systems, technologies, business processes and data. These digital assets have parent-child relationships that provide for cyber risk data to be rolled up or drilled down into the organization across the use cases. See FIG. 1.

Figure 2:
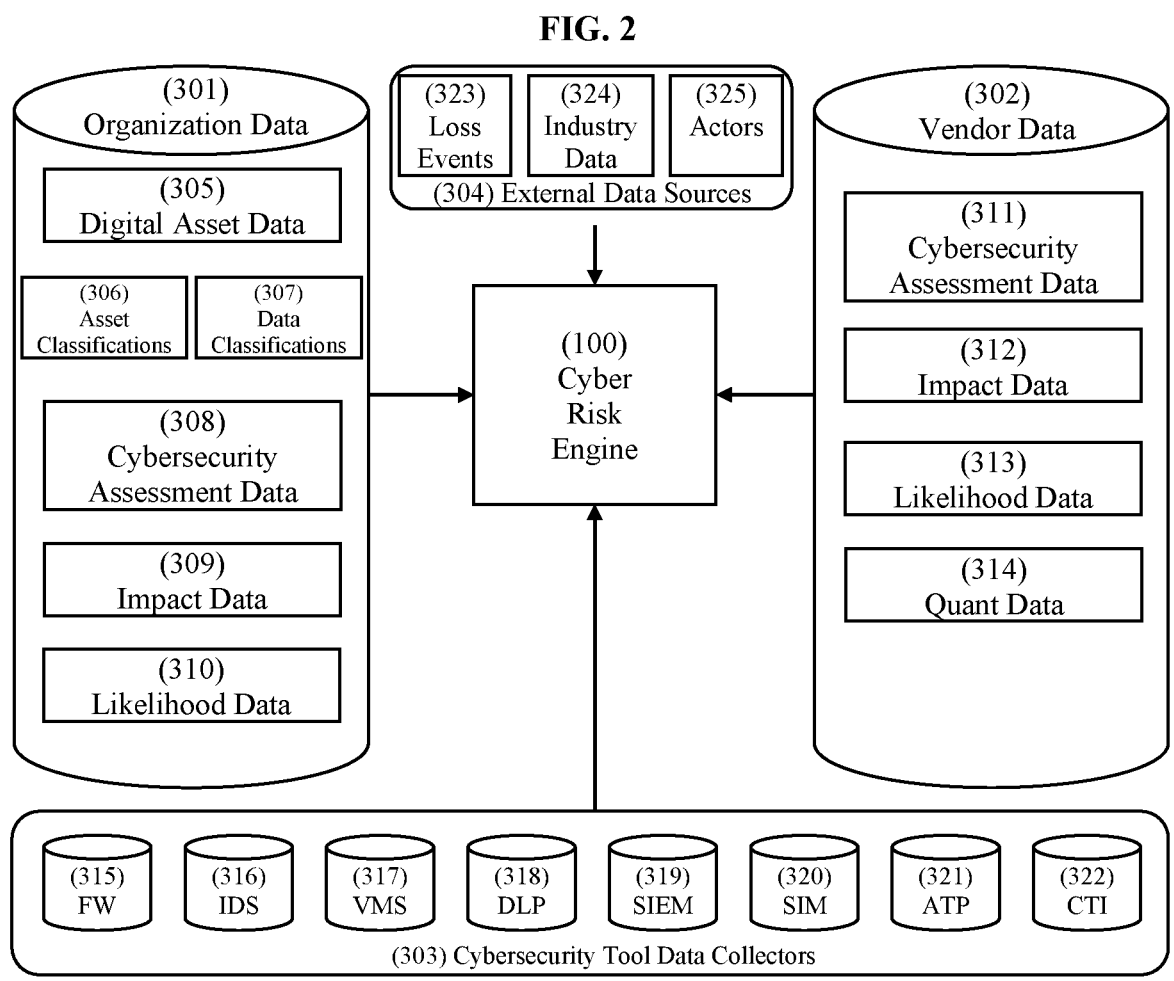
FIG. 2 is a block diagram of the architecture of the system and its components; inputs into the risk engine from organizations, vendors, external data sources and third-party cybersecurity tools.

The invention allows for customized cyber risk modeling using a graphical user interface (GUI) and a digital asset methodology. Every organization will model cyber risk slightly differently. Data can be used from internal sources, vendors, external sources and from cybersecurity tools. See FIG. 2. The user can define algorithms that calculate financial exposures. The financial exposures align to how a cyber insurance claim will be paid in terms of financial loss. These metrics include business interruption, data exfiltration and regulatory losses. Multiple risk models can be created based upon several different parameters and applied to various analysis including first party cyber risk to determine cyber insurance needs and to third-party loss scenarios to calculate vendor cyber risk exposures. Additionally, metrics important to cyber insurance companies can be quantified that include actuarial analysis, risk accumulation metrics and good cyber steward analysis. Furthermore, organizations can use the risk modeling for quantification of target asset cyber risk exposures in M&A due diligence.

The digital asset inventory includes systems and technologies. Systems are made up of a set of technologies such as but not limited to web application servers, and databases. Web application servers are a software framework that provides both facilities to create web applications and a server environment to run them. A database is used for the storage, retrieval, and updating of data in a computer system. Cyber risk attributes from databases are used in the cyber risk exposure algorithms that include record counts. An electronic database is used to store, identify, retrieve, and/or update data in a computer system. Cyber risk attributes from databases are used in the cyber risk exposure algorithms that include record counts. A server, for example, may provide a cloud-based cybersecurity service in response to requests from client devices. The server has an engine (e.g., a hardware processor, ASIC, or other component that executes a plurality of cyber security algorithms or other software applications stored in a solid-state memory device). The client device sends information and/or data to the server via a communications network (such as a corporate LAN/WAN and/or the Internet). The client device, for example, may execute a web browser that sends information, data, and/or parameters as IP packets of data describing or related to the digital asset, its attributes, the Data Classification, the organization's Cyber Exposure, the organization's Data Exfiltration Exposure, the organization's Business Interruption Exposure, the Regulatory Exposure, and any other data or information discussed herein. The client device may additionally or alternatively send data or information representing any selection made in the graphical user interface. The analyzes or processes the data or information sent from the client device to provide the cybersecurity service and to generate a result or output of the cybersecurity service. The server may then send the result or output via the communications network to an IP address associated with the client device. The server, as a simple example, may send the result as a webpage, which the client's web browser receives and processes for display.

The digital asset inventory includes business processes. Systems own or use business processes such as customer registration and purchase management, some of which process revenue. Cyber risk attributes from processes are used in the cyber risk exposure algorithms such as revenue generated per hour.

The digital asset inventory includes data types. For the purposes of cyber risk quantification, the data that is processed, or stored can be classified in terms of regulation. These include but are not limited to data that is regulated by governments or industry bodies such as privacy, medical or credit card data. Privacy data may be regulated by the EU Supervisory Authority if EU citizen data is utilized or by certain State's Attorney Generals (CO, CA and several others as of this writing), credit card is regulated by the PCI Security Council and healthcare data is regulated by U.S. Department of Health and Human Services. Multiple algorithms are created based on different attributes related to the type of data.

Figure 3:
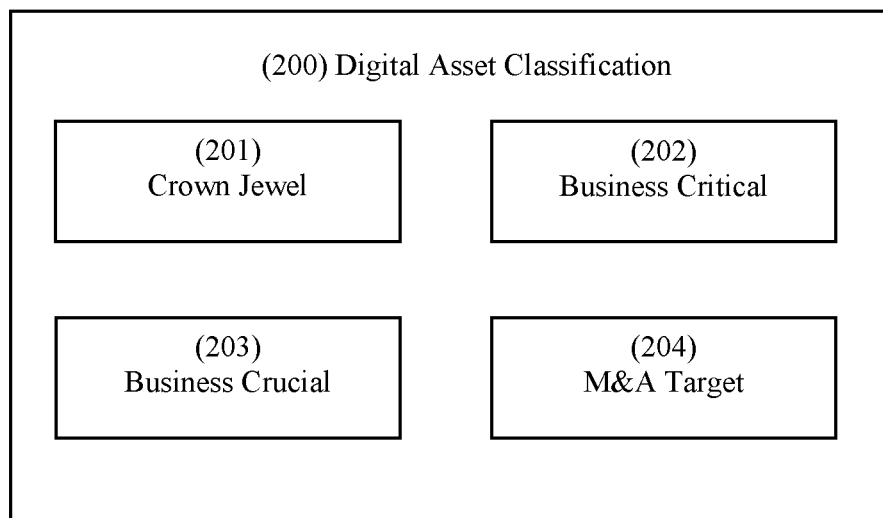
FIG. 3 is a block diagram of the digital asset classifications.

The invention allows for the classification of digital assets based on their importance. Any classification schema can be used. We recommend using an easily understood classification schema that is used in most organizations for business continuity management, these include crown jewel, business critical and business crucial classifications. Digital asset classifications are related to setting risk thresholds. See FIG. 3, which illustrates the electronic database storing electronic data representing groupings or associations of the different digital assets classified the crown jewel assets, the business critical assets, and the business crucial assets.

Digital asset classifications include crown jewels. Crown jewel digital assets are an organization's most prized or valuable digital assets, in terms of profitability and prospects. The crown jewels of an organization should be heavily guarded, allowing only certain people access to trade secrets and proprietary information, as these operations may be highly distinct from competitors' abilities and are often worth a lot of money. In the case of Equifax, a business that sells trust in the confidentiality and integrity of their data, the crown jewels are the customer information and their credit scores. Negative impact on the crown jewels can result in business unsustainability. See FIG. 14 for tolerance mappings for crown jewel assets.

Digital asset classifications include business critical. Business critical assets are those that are required in order to achieve a positive outcome. They may include patents/copyrights, corporate financial data, customer sales information, human resource information, proprietary software, scientific research, schematics, and internal manufacturing processes. Disruption due to a cyber-attack will not cause the organization to become unsustainable; however, it will have a significant financial impact in terms of loss of revenue or fines. See FIG. 14 for tolerance mappings for business-critical assets.

Digital asset classifications include business crucial. Business crucial assets are assets that are essential or vitally important because they determine an organization's outcomes; that is, the outcome pivots on the existence or value of the crucial asset(s). For example, an insurance company's claim response time is crucial to customer satisfaction and is data used in their A.M. Best rating. The amount of an insurer's surplus is directly related to its A.M. Best rating. Each digital asset can be mapped to an asset classification to understand which assets are more important to the business than others. See FIG. 14 for tolerance mappings for business crucial assets.

Asset classifications are used to identify target merger and acquisition assets when an organization is doing due diligence in the M&A process. See FIG. 3.

Figure 4:
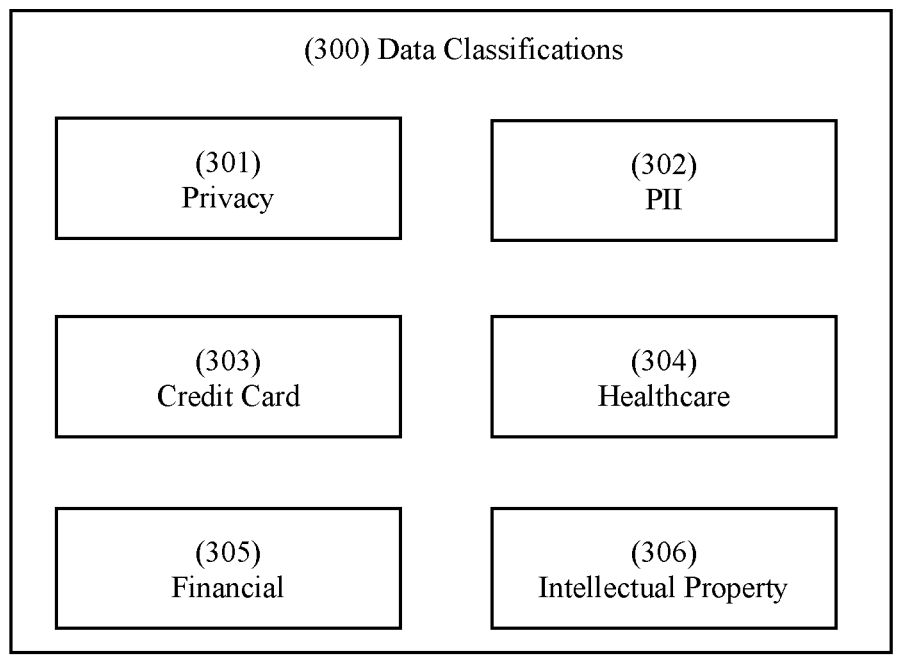
FIG. 4 is a block diagram of the data classifications.

The invention allows for data classification of digital assets that process or store sensitive data. Each organization can define the data classifications important to them. Many of these data classifications are used in regulatory risk quantification algorithms. These include but are not limited to privacy (EU citizen used in the GDPR), PII (using the NIST PII definition or any other state definition used in state privacy laws), credit card (PCI specific), healthcare (HIPPA and Hi-Tech specific), financial, federal, NIAC regulated, or any other type that the organization wants to measure and report against. See FIG. 4.

Figure 5:
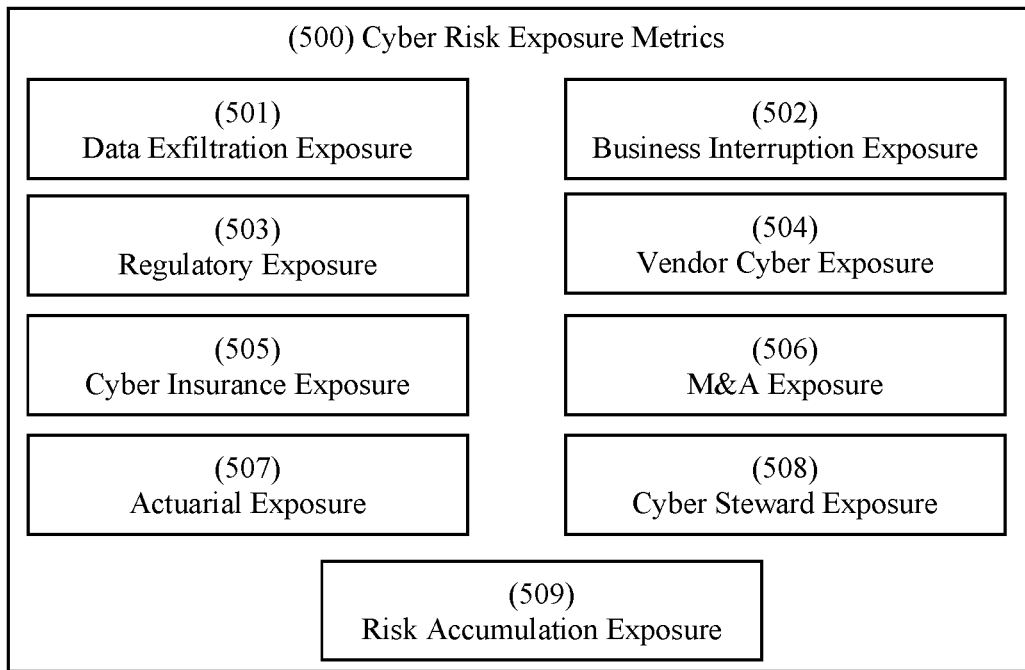
FIG. 5 is a block diagram of the digital asset quantification metrics used in the embodiment.
Figure 6:
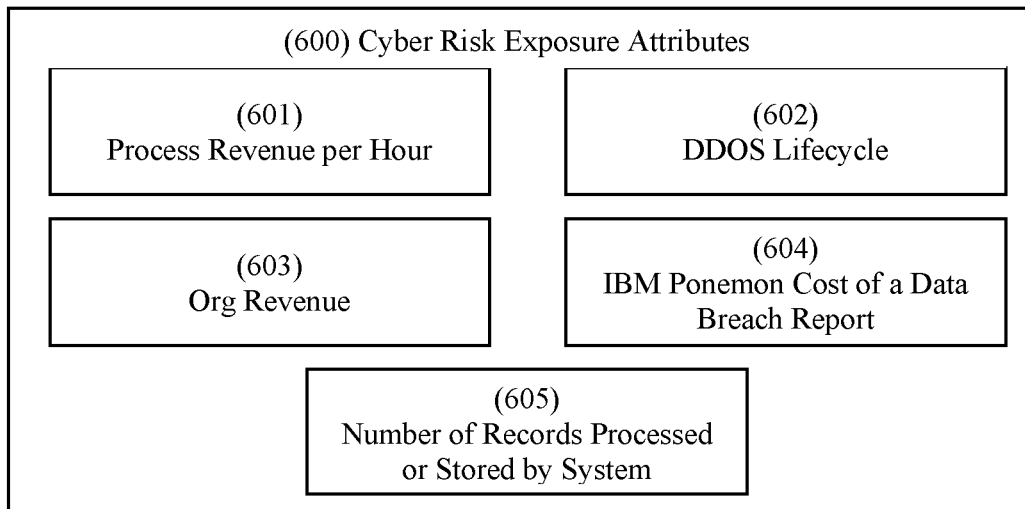
FIG. 6 is a block diagram of the digital asset quantification attributes used in the embodiment.

The invention allows for multiple financial exposures to be calculated. Using the digital asset inventory, asset classifications, data classifications and data form internal and external sources, the invention allows for the creation of multiple cyber risk algorithms to measure financial exposures. The graphical user interface has defined specific quantification models for data exfiltration, business interruption and regulatory loss calculations. Each quantification model can be associated to one or more algorithms that are defined using the graphical user interface. See FIG. 5 for Cyber Risk Exposures Metrics that can be defined. Multiple algorithms can be defined by associating a data type (privacy, financial, etc.) or across a business unit. This can be done since data was captured in terms of the organization, business unit, system, process, technology, data type when we did the digital asset inventory. Additionally, information has been captured in the digital asset inventory regarding the attributes used in the calculations including number of records, average revenue generated per hour and organization revenue. Number of records is a system attribute that is tied to the database that it utilized to store the records. Average revenue per hour is a process attribute that is related to a revenue generating process. Organization revenue is an organization attribute. The user chooses the attributes and defines the calculation using operators including addition, subtraction, multiplication and division to create the calculation. Constants can also be used in the calculations and include the average DDoS Lifecycle, and IBM Ponemon Cost of a data breach data, Algorithms are defined based on the user's requirements and can be applied to any data classification including but not limited to only systems that process privacy data or healthcare data or credit card data or EU citizen data or across all the systems. See FIG. 6 for Cyber Risk Exposure Attributes.

In one or more of the embodiments, the described technology allows for the ability to calculate data exfiltration exposure. Data exfiltration happens when attackers (individual cyber criminals, organized criminals, nation-states, etc.) steal the organizations information. We saw 149m user's data breached when Equifax was breached. The costs associated with data exfiltration include legal, notification expenses, forensics, monitoring and public relations (PR) costs. Cyber insurance will pay for all these costs. The financial exposure data exfiltration cyber risk algorithms are created based on the number of records a system has stored in its associated database multiplied by the average cost per record stolen. The system allows for the capture of the number of records in the GUI for each inventoried system. The average cost per record is obtained using the IBM Ponemon Cost of a Data Breach Report. This report provides breach costs from over 2,200 companies in 477 countries and is updated every 12 months. For each system, data exfiltration=number of records stolen*cost per record. The invention displays the data exfiltration exposures in summary and detail in a dashboard to sort financial exposures by each system and aggregate them into a total exposure metric. Risk reduction recommendations can be made to achieve records if data exfiltration exposures are extraordinarily large. See FIG. 7—701 for the data exfiltration financial exposure calculation attributes and algorithms.

In one or more of the embodiments, the described technology allows for the ability to calculate business interruption exposure. Secondly, cyber insurance claims can be made for revenue lost due to business interruption. Business interruption happens when a process is interrupted, and authorized users cannot access an application usually due to a denial of service (DoS) attack or ransomware attack. Revenue generating processes cannot apply their activities to a system that is unavailable. In this case the company cannot process transactions and will lose income. This is a process related metric that is captured by the invention. Algorithms are set up to calculate the business interruption loss. As an example, the average time to recover a system from a DoS attack is typically 48 hours. An algorithm can be set up to multiply the revenue processed per hour*48 hours to determine the amount of business interruption loss. To understand business interruption exposure, all the processes associated with revenue creation should be identified and this metric calculated. The embodiment provides a means to detail business processes and the revenue associated to each process, calculate the business interruption losses and summarize it for the organization. See FIG. 7—702 for the business interruption financial exposure calculation attributes and algorithms.

Lastly, some cyber insurance policies will also pay for regulatory loss. This is a data related metric and uses the data classification information to define the algorithm. As an example, in the case of EU citizen privacy data, the GDPR has fines that can be 4% of an organization's revenue or €20 million, whichever is higher. The system captures the organizational revenue attribute to utilize with this algorithm. The system has also captured data classifications that are used to isolate in this case only systems that process privacy data in the algorithm. See FIG. 7, illustrating different exposures, their inputs to the cybersecurity algorithm(s), and the outputs generated by the cybersecurity algorithm(s). Block 7—701 illustrates the data exfiltration exposure.

Data exfiltration of U.S. healthcare records is regulated by the U.S. Department of Health and Human Services (HHS). Fines are based on the number of records stolen. See FIG. 7—704 for the HIPAA financial exposure calculation attributes and algorithms.

Data exfiltration of credit card data falls under the guidance of the PCI Security Council. Fines are based on the level of the Merchant and the number of records stolen. See FIG. 7—705 for the PCI financial exposure calculation attributes and algorithms.

In addition, to the GDPR there is now privacy legislation in several states in the U.S. These are new laws enforced by the Attorney General of each state. It is anticipated that fines will be in accordance to the number of records stolen. See FIG. 7—706 for the privacy financial exposure calculation attributes and algorithms.

The invention allows for cyber risk scoring in terms of digital asset impact and likelihood. This provides an inside view of cyber risk as it relates to the digital assets. They can be measured in terms of inherent (with no cybersecurity controls in place) cyber risk scoring that allows an organization to understand how the digital assets likelihood and impact serve as a benchmark to compare digital asset risk. The inherent risk scores are derived based on digital asset characteristics of impact and likelihood.

Inherent cyber risk impacts are derived from a series of digital asset questions that relate to the degree to which a cyber-issue may have an adverse outcome on the organization. There are several factors that can influence impact in cybersecurity. These include but are not limited to the security innovation of the technology used by the system, the physical location of the system, the attack cadence that indicates how often it is targeted by cyber criminals, asset classification, stock impact for public companies, the time to recover the system, the cost of restoring the system, the number of records, how many regulations the system must be compliant with, and the degree of reputational damage. As another example, system recovery time can be stated in terms of the recovery time objective (RTO) and is the maximum tolerable length of time that a computer, system, network, or application can be down after a failure or disaster occurs. As an example, Crown jewel systems should have a low RTO of approximately a 0-4 hours, business critical 4-12 hours, and business crucial 12-24 hours. As the RTO time increases the impact will increase. Each impact attribute can be weighted when defining the cyber risk score in terms of importance to the organization. The series of digital asset questions may be generated by the graphical user interface displayed by the client device, with the graphical user interface prompting the user to select or input an answer to each question. See FIG. 8 for all inherent cyber risk impact attributes and algorithms.

Likelihood is the probability that a cyber-attack will cause damage. There are several factors that can influence likelihood in cybersecurity. These include but are not limited to the number of users, types of users, system location, level of accessibilities, breach localization, skills needed to breach, and type of system (home grown or off the shelf system). As an example, the higher the number of users the higher the likelihood. Another example is the types of users. Vendors have a higher likelihood than employees. Each likelihood attribute can be weighted when defining the cyber risk score in terms of importance to the organization. See FIG. 9 for all inherent cyber risk likelihood attributes and algorithms. An inherent risk score for each digital asset is created by multiplying the impact and likelihood associated to each digital asset.

The invention allows for the calculation of residual cyber risk (risk with controls in place) using data from security assessments such as but not limited to the NIST Cybersecurity Framework, ISO 27001, and data from cybersecurity tools that identify, detect, and protect digital assets. This can be any category of cybersecurity tool such as Data Loss Prevention (DLP), Vulnerability Management Scanners, (VMS), Security Incident and Event Management (STEM) that are tagged back to the digital asset that they are detecting, protecting or identifying a cyber issue to. See FIG. 10—1003.

Security assessments will lower the inherent cyber risk score based on the level of controls in place and data from cybersecurity tools will increase the cyber risk score. As an example, on a scale of 0-5, if the inherent risk score is a 2.0 an it is a crown jewel digital asset it may have a risk threshold of 1.5. The security assessment shows that 50% of the controls are in place so the algorithm can be configured to reduce the inherent score accordingly by 50% to 1.0. See FIG. 10—1004.

Residual cyber risk scores will rise when a threat, vulnerability or incident is detected based on the level of severity. Vulnerabilities severities are provided via data from the NIST CVE database. Incidents and threats are tagged to digital assets with severities manually in the graphical user interface.

If a cyber issue arises from a vulnerability, incident or threat that raises the risk above the risk threshold (based on its asset type) an alert can be generated to investigate and see if action should be taken to reduce risk back to acceptable limits. Risk tolerances are based on the type of digital asset (crown jewel, business critical, business crucial). The described technology in various embodiments accurately allows each organization to define which digital asset characteristics are more important to them and to understand when action should be taken if risk rises above thresholds. Each asset classification should have a threshold set that allows for the alerts to be send when residual risk rises above them. See FIG. 11 for recommended cyber risk scoring thresholds based on a scale of 0-5.

Embodiments of the described technology are also related to measuring cyber resilience. Cyber resilience is a metric that is defined using inherent and residual cyber risk scores and risk tolerance. Goals can be set to increase cyber resiliency. Resiliency is the goal score divided by the residual risk score. The percent to goal is 1—the resiliency score. See FIG. 15.

Digital assets have relationships not only within an organization but also between an organization and third-parties whether they be a third-party service provider (such as a management consulting company that implements IT solutions or a cloud service provider) or a computer vendor (that they have purchased hardware, software or devices from) can be demonstrated with the invention. The invention provides useful data to understand first party and third-party cyber risk exposures and the risk relationships between each party. The data owner is responsible to secure the data regardless of if the organization has outsourced data processing work to a third-party. Facebook and Cambridge Analytica are examples of this type of relationship and the consequences of not managing the relationship properly. The invention provides useful metrics to manage the relationships in terms of cyber insurance needs for third parties who process sensitive data. Organizations rely on insurance brokers to suggest cyber insurance amounts to buy with no understanding of the actual amounts needed based on the cyber exposure of the organization or the risk that is inherited from their outsourcing to 3rd parities.

In one or more of the embodiments the described technology will identify which digital assets third party vendors touch in an organization and quantify the third-party risk. Current vendor cyber risk management utilizes deep and dark web data to get externally based information that is insufficient to understand the cyber risk the vendor poses to the organization. Third-party vendor cyber risk is inherited by the first party (the organization) when a cyber insurance claim is filed. Utilizing a digital asset approach for each vendor in conjunction with the risk quantification outlined above provides the exposure that each vendor poses to the organization. Vendors will touch inputs to the system, the system itself and outputs to the system. See FIG. 12.

The invention allows for vendor cyber risk scoring to be utilized in vendor risk management programs both pre and post-RFP to decrease $3^{rd}$ party cyber risk. Security assessments can be used to understand likelihood metrics. Action can be taken to lower vendor risk including 1) defining a remediation plan, 2) monitoring and 3) replacing the vendor.

The invention allows for the quantification of cyber risk exposure amplification due to reputational, legal or operational damage. Each amplifier is created by choosing a percentage that is reported in research. As an example, in terms of reputational amplification, Equifax lost 30% of their stock price and has not recovered. The stock price is multiplied by the percent to get the amplifier. See FIG. 16—16001. In term of legal amplification, the data exfiltration exposure is multiplied by a percent. See FIG. 16—1602. In terms of operational exposure, the business interruption exposure is multiplied by a percent. See FIG. 16—1603. Amplification exposure in addition to the data exfiltration exposure that amplifies the cyber risk exposure.

The invention allows for risk relationships that can be applied across an organization in terms of how risk rolls up from the digital assets to the business units that own them, business units to the organization, organization to the subsidiaries, subsidiaries to the parent company, and to the holding company. Business units have parent-child relationships were risk is inherited by aggregating the risk of each digital asset that the business unit owns. As an example, the sales business unit is the system owner of the CRM system, processes, data and technologies. It is the business unit that has purchased or paid for the creation of those digital assets and is impacted by its cyber risk.

Most organizations budget cybersecurity as a percentage of IT spend. This does not provide for cost-based budgeting and is ineffective. The invention allows for the use of Digital Asset-based Cost-Based Budgeting across an organization. This allows for the cyber budget to be aligned to the fixed operational costs (the security team personnel) and the capital fixed costs (the tools and their licensing costs) and the variable costs for each business unit that owns the digital asset. The variable costs are the costs associated with the people, process and tool costs to fix real time incidents, security findings and vulnerabilities. Operational Fixed Cost Data is entered into the graphical user interface from the HR systems or manually about each individual that has a role in managing, fixing or reporting on cybersecurity tasks. Fixed Capital Costs for the cybersecurity tools are captured in the front-end GUI and can be pro-rated across each business unit. These can be captured in terms of annual subscriptions, CPU usage or perpetual license costs. Variable costs are associated to the security assessment findings, vulnerabilities or incidents based on a case by case basis. The invention allows for the addition of third-party personnel with hourly, monthly or weekly rates to calculate variable personnel costs. Data is rolled up and analyzed into a cost-based budget for cybersecurity.

In one or more of the embodiments the described technology provides cybersecurity return on investment (ROI) data based on the amount of risk exposure reduction each tool provides and the cost of the tool to be utilized, implemented or purchased. Data provided from vendors on risk reduction is utilized for each type of cybersecurity tool. The amount of risk exposure reduction is calculated based on the digital asset exposure the tool identifies, detects or protects against—cost then divided by the cost. See 17.

In one or more of the embodiments, the described technology allows for the ability to calculate cyber insurance needs. The aggregate cyber insurance policy limit is defined as the sum of data exfiltration exposures. The business interruption limit is defined from the percent of on-premise applications*crown jewel RTO*average revenue per hour. See FIG. 18.

In one or more of the embodiments the described technology provides the ability to prioritize resources based on the cyber risk exposures and risk scores.

The invention has a Management Platform that consists of a series of dashboards, reports and workflows. The management platform provides role-based access to the cyber risk metrics and displays data in dashboards for analysis and action using a rules-based workflow engine. Each user looks at the data in the context relevant to their role.

APPENDIX FOOTNOTES

1. Allianz Global Corporate & Specialty, 2018, "Allianz Risk Barometer 2018—Preview" Jan. 3, 2018, https://www.youtube.com/watch?time_continue=9&v=3NbtFQw3AGYhttp://www.agcs.allianz.com/insights/white-papers-and-case-studies/allianz-risk-barometer-2018/2.
2. Nick Eubanks, "The True Cost of Cyber Crime for Businesses," Forbes, Jul. 13, 2017, www.forbes.com/sites/theyec/2017/07/13/the-true-cost-of-cybercrime-for-businesses/#380e0f694947
3. IBM Security, "2017 Cost of a Data Breach Study", Ponemon Institute, June 2017, www.ibm.com/security/data-breach
4. "Cybercrime Costs to Reach $8 Trillion by 2022," Dark Reading, May 30, 2017, www.darkreading.com/threat-intelligence/cybercrime-costs-to-reach-$8-trillion-by-2022/d/d-id/1328990?
5. Internet World Stats, "Internet Growth Stats," December 2017, www.internetworldstats.com/emarketing.htm
6. The Guardian, "Revealed: 50 million Facebook profiles harvested for Cambridge Analytica in major data breach," Mar. 17, 2018, www.theguardian.com/news/2018/mar/17/cambridge-analytica-facebook-influence-us-election
7. EU Commission, "DIRECTIVE (EU) 2016/680 OF THE EUROPEAN PARLIAMENT AND OF THE COUNCIL of 27 April 2016", https://eur-lex.europa.eu/legal-content/EN/TXT/?uri=uriserv%3AOJ.L_.2016.119.01.0089.01.ENG&toc=OJ%3AL%3A2016%3A119%3ATOC
8. Gartner, "Gartner Says 8.4 Billion Connected "Things" Will Be in Use in 2017, Up 31 Percent From 2016," Press Release, Feb. 7, 2017, www.gartner.com/newsroom/id/3598917
9. Christopher Udemans, "China's IoT manufacturers are reducing costs at the expense of our privacy and security", Jul. 2, 2018, Technode, https://technode.com/2018/07/02/iot-security-privacy/
10. Louis Columbus, "Analytics, Data Storage Will Lead Cloud Adoption In 2017", Forbes, Nov. 20, 2016, www-.forbes.com/sites/louiscolumbus/2016/11/20/analytics-data-storage-will-lead-cloud-adoption-in-2017/#149d4cdd7e7a
11. Mahmood Sher-Jan, "Surprising Stats on Third Party Vendor Risk and Breach Likelihood", International Association of Privacy Professionals, Aug. 21, 2017, https://iapp.org/news/a/surprising-stats-on-third-party-vendor-risk-and-breach-likelihood/
12. Erin Myers, "Cyber risk management truly go enterprise-side in 2018, predicts Aon report," Advisen, Jan. 12, 2018, http://www.advisen.com/tools/fpnproc/fpns/article-s_new_35/P/300792105.html?rid=300792105&list_id=35
13. Division of Corporate Finance Securities and Exchange Commission, "CF Disclosure Guidance: Topic No. 2, Cybersecurity Oct. 13, 2011", SEC, Oct. 13, 2011, www.sec.gov/divisions/corpfin/guidance/cfguidance-topic2.htm

The invention claimed is:

1. A method executed by a computer that quantifies a cyber risk associated with a digital data asset, the method comprising:
   capturing, by the computer from a digital asset inventory of digital assets, a number of records stored in a database;
   capturing, by the computer from the digital asset inventory of the digital assets, an average revenue per hour;
   capturing, by the computer from the digital asset inventory of the digital assets, an organization revenue;
   displaying, by the computer, the number of records stored in the database, the average revenue per hour, and the organization revenue via a graphical user interface having definable mathematical operands including addition, subtraction, multiplication, and division;
   receiving, by the computer, algorithmic selections via the graphical user interface specifying the number of records stored in the database, the average revenue per hour, the organization revenue and the definable mathematical operands including at least one of the addition, the subtraction, the multiplication, and the division;

creating, by the computer, the cyber risk algorithm using the algorithmic selections specifying the number of records stored in the database, the average revenue per hour, the organization revenue, the definable mathematical operands including at least one of the addition, the subtraction, the multiplication, and the division, the digital asset inventory of the digital assets, asset classifications associated with the digital assets, data classifications associated with the digital assets, internal data sources associated with the digital assets, and external data sources associated with the digital assets; and financially quantifying, by the computer, the cyber risk associated with the digital data asset of the digital data assets by executing the cyber risk algorithm.

2. The method of claim 1, further comprising sending a webpage that specifies the cyber risk associated with the digital data asset.

3. The method of claim 1, wherein the financially quantifying the cyber risk further comprises calculating a data exfiltration exposure based on the number of records stored in the database multiplied by a cost per record.

4. The method of claim 1, wherein the financially quantifying the cyber risk further comprises calculating a business interruption exposure based on the average revenue per hour.

5. The method of claim 1, wherein the financially quantifying the cyber risk further comprises calculating a regulatory loss based on the organization revenue.

6. The method of claim 3, further comprising determining a cyber insurance associated with the digital data asset based on the data exfiltration exposure.

7. The method of claim 1, further comprising comparing the cyber risk to a threshold value.

8. The method of claim 7, further comprising determining the cyber risk fails to satisfy the threshold value.

9. The method of claim 8, further comprising generating an alert in response to the cyber risk failing to satisfy the threshold value.

10. The method of claim 1, further comprising capturing, by the computer from the digital asset inventory of the digital assets, a CPU usage associated with a central processing unit (CPU).

11. The method of claim 10, further comprising providing a cyber budget based on the CPU usage captured from the digital asset inventory of the digital assets.

* * * * *